United States Patent [19]

Wiley

[11] 3,906,144

[45] Sept. 16, 1975

[54] FILM CIRCUIT ASSEMBLIES

[75] Inventor: David Wiley, Walsall, England

[73] Assignee: The Lucas Electrical Company, Limited, Birmingham, England

[22] Filed: Dec. 28, 1973

[21] Appl. No.: 429,399

[30] Foreign Application Priority Data

Jan. 16, 1973 United Kingdom ................. 2240/73

[52] U.S. Cl. ..................... 174/52 S; 357/72; 357/74
[51] Int. Cl. ............................................. H05k 5/06
[58] Field of Search .......... 174/DIG. 3, 52 S, 52 PE, 174/DIG. 5; 317/234 G, 234 E, 234 A, 100; 29/626, 588–591

[56] References Cited

UNITED STATES PATENTS

| | | | |
|---|---|---|---|
| 3,178,506 | 4/1965 | Derich et al. | 174/52 PE |
| 3,209,065 | 9/1965 | Steiner | 174/52 PE |
| 3,622,419 | 11/1971 | London et al. | 174/52 PE X |
| 3,689,804 | 9/1972 | Ishihama et al. | 174/52 PE X |
| 3,801,874 | 4/1974 | Stefani | 174/DIG. 5 X |

*Primary Examiner*—Darrell L. Clay
*Attorney, Agent, or Firm*—Holman & Stern

[57] ABSTRACT

A film circuit assembly which has a film circuit and a housing for the film circuit, the housing having a support plate formed of material possessing a high thermal conductivity and on which the film circuit is mounted, and a cover which together with the support plate encloses the film circuit and which supports electrical connections for the film circuit, the cover and film circuit defining a cavity which is at least partially filled with a material for protecting the film circuit.

3 Claims, 2 Drawing Figures

FILM CIRCUIT ASSEMBLIES

BACKGROUND AND SUMMARY OF THE INVENTION

This invention relates to a film circuit assembly.

In accordance with one aspect of the present invention there is provided a film circuit assembly comprising a film circuit and a housing for said film circuit said housing comprising a support plate which is formed of material possessing a high thermal conductivity and on which said film circuit is mounted, and a cover which together with said support plate encloses said film circuit and which supports electrical connections for said film circuit, said cover and said film circuit defining therebetween a cavity which is at least partially filled with a material for protecting said film circuit.

Preferably, said electrical connections are each formed of resilient material.

Desirably, a layer of silicone grease is disposed between said support plate and said film circuit.

Conveniently, said cover is formed of synthetic resin material and the protective material is silicone resin.

BRIEF DESCRIPTION OF THE DRAWINGS

The invention will now be more particularly described with reference to the accompanying drawing wherein.

DETAILED DESCRIPTION OF THE PREFERRED EMBODIMENTS

Figure 2:
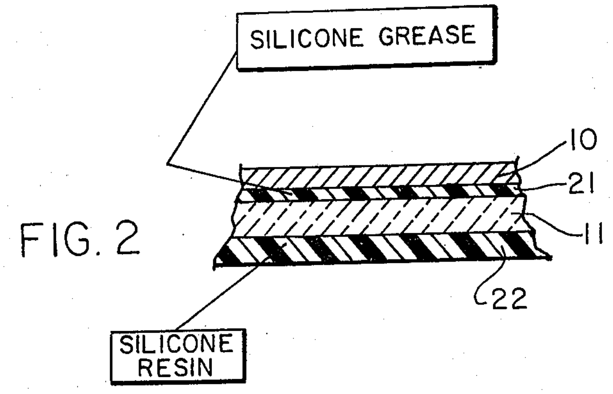
FIG. 2 is an enlarged cross-sectional view taken along line II—II of FIG. 1.
Figure 1:
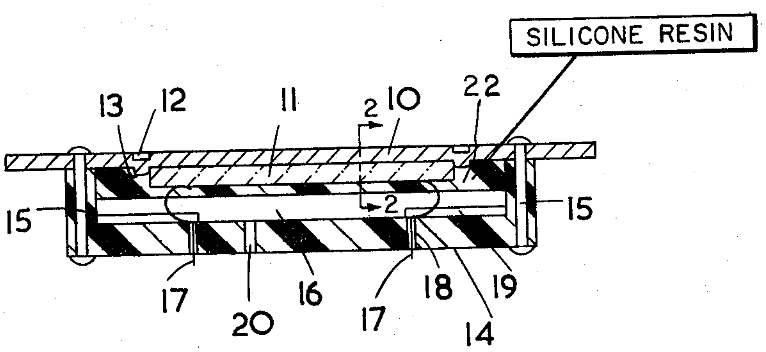
FIG. 1 is a cross-sectional view of a film circuit assembly according to the instant invention.

Referring now more particularly to the drawing, the film circuit assembly shown therein comprises a support plate 10 which is formed of aluminium sheet, steel, or other material possessing a high thermal conductivity so as to serve as a heat sink for a thick film circuit 11 in the form of an aluminia substrate having resistors, capacitors and semiconductor devices on it. A plurality of indentations 12 are made in one surface of the support plate 10 so as to cause the formation of a corresponding number of pips 13 which project from the opposite surface of the plate 10 and which serve to locate the circuit 11 laterally with respect to the plate 10. A film of silicone grease 21 (FIG. 2) is smeared on said opposite surface of the plate 10 prior to mounting the circuit 11 thereon so that the circuit 11 will adhere to the plate by virtue of surface tension. It will be understood that silicone grease 21 possesses a very good thermal conductivity.

An open ended, hollow, cuboidal, synthetic resin cover 14 is then secured to the plate 10 by means of rivets 15 so that the plate 10 together with the cover 14 enclose the film circuit 11 and so that a cavity 16 is defined between the circuit 11 and the cover 14.

The cover 14 supports and locates electrical connections 17 for the circuit 11. Each connection 17 is formed from a strip of silver plated spring steel or other resilient, electrically conductive material and each connection 17 extends through a slot 18 formed in the cover 14, and has a generally C-shaped free end disposed within the cover 14 so that a portion of each connection 17 will resiliently engage a desired region of the circuit 11. Moreover, each slot 18 is disposed between a pair of parallel spaced apart, ribs 19 integrally formed on the inner surface of the cover 14. These ribs 19 serve to locate the C-shaped portion of the connection 17 in a lateral direction.

Finally, the cover 14 is provided with an aperture 20 through which is soft protective material 22 such as the silicone resin sold under the Trade Mark "SYLGARD" can be injected in such a manner as to cover the circuit 11 to thereby protect the latter from ambient conditions.

What is claimed is:

1. A film circuit assembly comprising, a film circuit, a housing for said film circuit, said housing including a support plate formed of a material possessing a high thermal conductivity and on which said film circuit is supported, the housing further including a cover which together with the support plate encloses said film circuit, a layer of a fluid material having a high thermal conductivity sandwiched between said film circuit and said support plate, and, a plurality of resilient electrical connectors carried by said cover and resiliently engaging said film circuit, said cover and said film circuit defining therebetween a cavity which is at least partially filled with a material for protecting said film circuit.

2. An assembly as claimed in claim 1 wherein said layer of fluid material having a high thermal conductivity is a layer of silicon grease.

3. An assembly as claimed in claim 1 in which said cover is formed of synthetic resin material and the protective material is silicone resin.

* * * * *